United States Patent Office
3,528,644
Patented Sept. 15, 1970

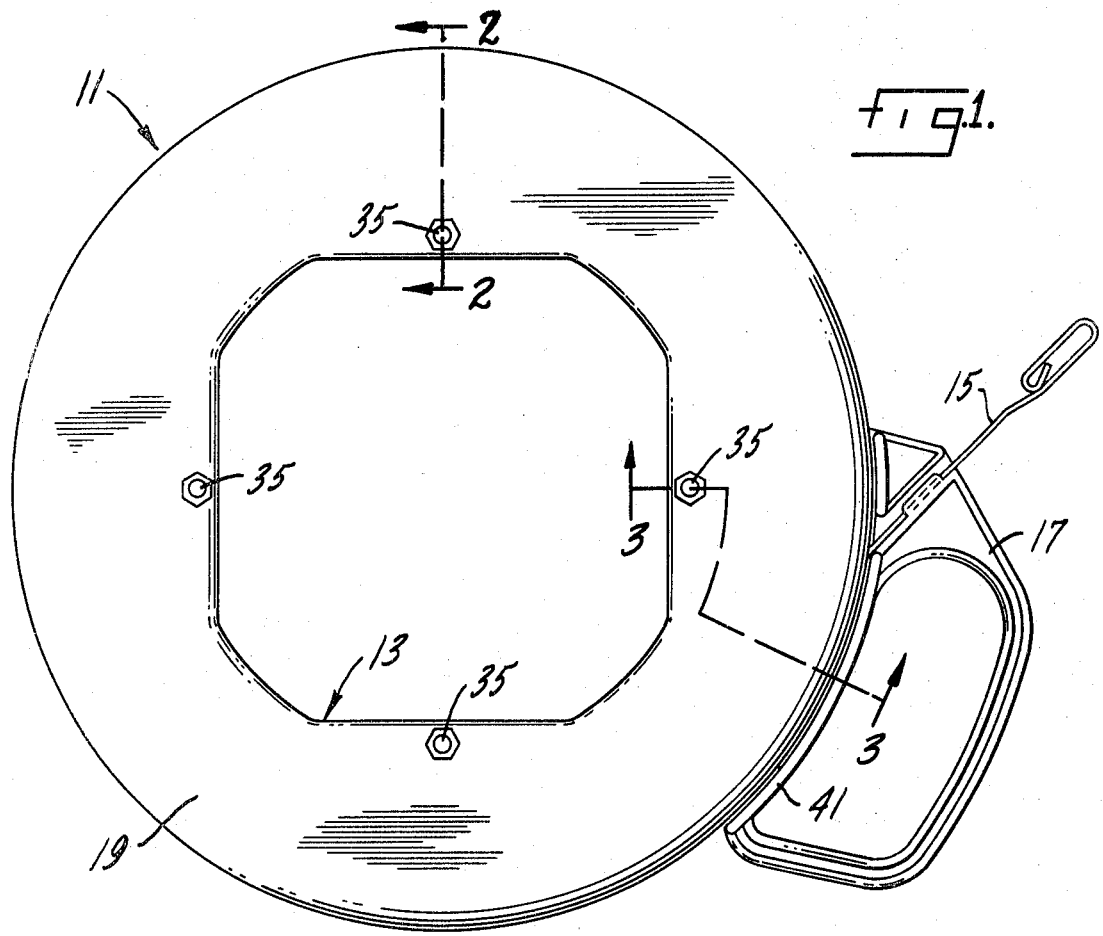
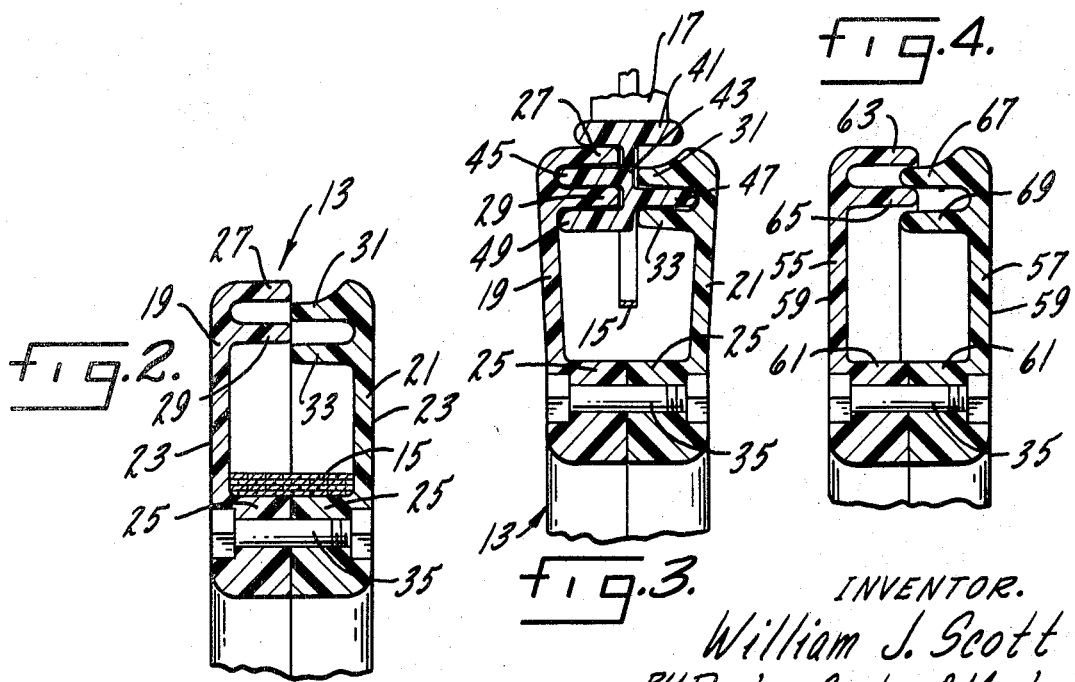

3,528,644
FISH TAPE REEL WITH STAGGERED TAPE ENGAGING LIPS
William J. Scott, Sycamore, Ill., assignor to Ideal Industries, Inc., Sycamore, Ill., a corporation of Delaware
Filed Dec. 12, 1968, Ser. No. 783,389
Int. Cl. B65h 75/36
U.S. Cl. 254—134.3    9 Claims

ABSTRACT OF THE DISCLOSURE

An electrician's finish tape reel assembly including a reel, a fish tape and a fish tape winder. The reel is made of annular sections which are fastened to each other adjacent their inner walls. The outer lips of the reel sections, and the intermediate lips, if provided, are offset radially to one another. If desired, the outer and intermediate lips may overlap one another.

SUMMARY OF THE INVENTION

This invention relates to an electrician's fish tape reel and more specifically to such a reel having radially offset, peripheral lips through which the electrician's fish tape passes during winding and unwinding relative to the reel.

An object of this invention is an electrician's fish tape reel in which the outer walls or lips of the reel sections are not aligned radially.

Another object is a fish tape reel having non-aligned outer lips which contact the tape to impose a drag on the tape.

Another object is an electrician's fish tape reel in which the outer lips of the reel overlap each other.

Another object is a winder for a fish tape reel assembly which fits a reel having outer lips that are offset radially to one another.

Other objects may be found in the following specification, claims and drawings.

BRIEF DESCRIPTION OF THE DRAWINGS

The invention is illustrated more or less diagrammatically in the following drawings wherein:

FIG. 1 is a plan view of an assembly, including a reel, a fish tape and a tape winder, embodying the novel features of this invention;

FIG. 2 is a cross-sectional view taken along line 2—2 of FIG. 1;

FIG. 3 is a cross-sectional view taken along line 3—3 of FIG. 1; and

FIG. 4 is a cross-sectional view if a modified form of reel.

DESCRIPTION OF THE PREFERRED EMBODIMENTS

A fish tape reel assembly 11 embodying the novel features of the invention is shown in FIG. 1. The assembly includes a reel 13, a fish tape 15 and a fish tape winder 17.

The reel 13 is made of two generally annular shaped sections 19 and 21 which may be formed of any suitable material such as metal or plastic. Each reel section has a generally flat radial or sidewall 23 and an upstanding inner peripheral wall 25. Reel section 19 has an upstanding outer peripheral wall or lip 27 and an intermediate upstanding wall 29. Reel section 21 has an outer upstanding wall or lip 31 and an intermediate upstanding wall 33.

It should be noted that the outer and intermediate walls 27 and 29 of reel section 19 are spaced farther out radially from the center of the reel than the corresponding outer and intermediate peripheral walls 31 and 33 of reel section 21. When the reel sections 19 and 21 are fastened together by the bolts 35, the outer and intermediate walls will not align but will be offset radially relative to one another. In the reel depicted in FIGS. 1, 2 and 3, the outer and intermediate walls 27 and 29 and 31 and 33 of the reel sections are approximately the same height as the inner peripheral walls 25 so that there is no overlap of the walls when the reels are assembled.

A cross section of the winder 17 as it fits into the reel 11 is shown in FIG. 3. This winder is equipped with a top flange 41 which rides on the outer wall 27 of the reel section 19. The winder also has a number of other flanges attached to a center web 43 and offset relative to one another with these other flanges adapted to fit between and against the outer and intermediate walls of the reel sections. For example, flange 45 rides between outer wall 27 and intermediate wall 29 of the reel section 19; flange 47, which is located on the opposite side of the web from flange 45, fits between outer wall 31 and intermediate wall 33 of the reel section 21; and flange 49 rides against the inner surface of intermediate wall 29 of reel secion 19. The web 43 is narrower than the tap 15 so that the tape will engage the intermediate and outer lips of the reel sections.

FIG. 4 shows a modified form of reel having reel sections 55 and 57. Each reel section has a flat annular sidewall 59 and an upstanding inner peripheral wall 61. Reel section 55 has an upstanding outer peripheral wall or lip 63 and an intermediate upstanding wall 65 with the intermediate wall being located between the inner and outer walls and concentric therewith. Reel section 57 has an outer peripheral wall 67 and an intermediate peripheral wall 69. The outer and intermediate peripheral walls of the reel section 55 are located radially outward a greater distance from the center of the reel than the corresponding outer and intermediate peripheral walls 67 and 69 of the reel section 57. Also, the outer and intermediate peripheral walls of the reel sections have greater heights than the inner peripheral walls 61 so that when the reel sections are fastened together as shown in FIG. 4, the outer and intermediate walls of the reel sections will overlap.

The use, operation and function of this invention are as follows:

The fish tape reel of this invention may be used with or without a fish tape winder 17. When a winder is used, as is shown most clearly in FIGS. 1 and 3, the web 43 of the winder effects a partial spreading of the outer lips 27 and 31 with the tape 15 providing additional spreading to allow passage of the tape between the reel sections. This is advantageous because the lips provide a drag on the tape which aids in the winding and unwinding of the tape about the inner peripheral walls 25 of the reel sections. If a winder is not used, the tape will do all of the spreading of the outer and intermediate peripheral walls.

When the reel sections are connected together, the outer and intermediate peripheral walls of the opposite sections may be flush, as shown in FIG. 2, or they may overlap as shown in FIG. 4. It is also possible, depending upon the nature of the material used in forming the reel sections, that the outer and intermediate walls of the adjoining sections may be spaced apart a distance not exceeding the width of the tape 15. Further, it may be desirable in some reel constructions to eliminate the intermediate walls 29 and 33 or 65 and 69 of the reels. Likewise, it may be desirable in some constructions to eliminate the innermost flange 49 of the tape winder 17. In such a situation, the intermediate walls 29 and 33 of the reel sections would prevent the coiled tape from interfering with the movement of the winder.

Whereas several forms of the invention have been shown and described, it should be understood that the scope of the invention is not limited to the preferred forms shown herein.

What is claimed is:

1. An electrician's fish tape reel including:
a pair of generally annular shaped reel sections connectable with each other,
each of said annular reel sections being generally flat and having upstanding inner and outer peripheral walls,
the inner walls of each reel section being adapted to contact each other when the reel sections are connected together,
the outer walls of each reel section being spaced apart radially relative to the center of the reel when the reel sections are connected together, and
means to connect the annular reel sections to each other.

2. The structure of claim 1 further characterized in that a third upstanding wall is formed on at least one of the annular reel sections concentric with and located between said inner and outer walls of its section with said third wall being spaced apart radially of the outer wall of said other annular reel section relative to the center of the reel when said reel sections are connected together.

3. The structure of claim 1 further characterized in that a third upstanding wall is formed on at least one of the annular reel sections concentric with and located between said inner and outer walls of its section with said third wall being spaced radially of the outer wall of said other section relative to the center of the reel so that when said sections are connected together, said outer wall of said other section is located radially between said outer wall and said third upstanding wall of said first reel section.

4. The structure of claim 1 further characterized in that a third upstanding wall is formed on each of the annular reel sections with each of said third walls being concentric with and located between said inner and outer walls of its section, the outer and third walls of each reel section being spaced apart radially relative to the center of the reel when the reel sections are connected together.

5. The structure of claim 1 further characterized in that a third upstanding wall is formed on each of the annular reel sections concentric with and located between the inner and outer walls of its section with the walls arranged radially of the center of the reel so that the third wall of one reel section is located radially between the inner and third wall of the other reel section and the outer wall of said first reel section is located between the outer and third wall of the other reel section when the reel sections are joined together.

6. The structure of claim 1 further characterized in that the upstanding walls of the reel sections are spaced apart transversely when the reel sections are connected together a distance less than the width of the tape to be inserted in said reel.

7. The structure of claim 1 further characterized in that the height of said upstanding outer wall is less than the height of said upstanding inner walls.

8. The structure of claim 2 further characterized in that the height of the upstanding outer and third walls is less than the height of the upstanding inner wall.

9. An electrician's fish tape reel assembly including a pair of generally annular shaped reel sections removably connectable with each other,
each of said annular sections being generally flat and having upstanding inner, outer and intermediate walls,
the inner walls of each section being adapted to contact each other when the sections are connected together,
the intermediate and outer walls of each section being offset radially of the center of the reel when the sections are connected together,
a tape connected to said reel and passing out of said reel between said intermediate and outer walls, with the spacing between the intermediate and outer walls of said sections being such that the tape spreads the reel sections apart as it passes into and out of said reel.

References Cited

UNITED STATES PATENTS

| | | | |
|---|---|---|---|
| 3,062,475 | 11/1962 | Miller | 242—85.1 |
| 3,355,123 | 11/1967 | Schinske | 242—84.8 |
| 3,424,435 | 1/1969 | Niemann | 242—84.8 XR |

STANLEY N. GILREATH, Primary Examiner

W. H. SCHROEDER, Assistant Examiner

U.S. Cl. X.R.

242—85.1